United States Patent Office 3,175,077
Patented Mar. 23, 1965

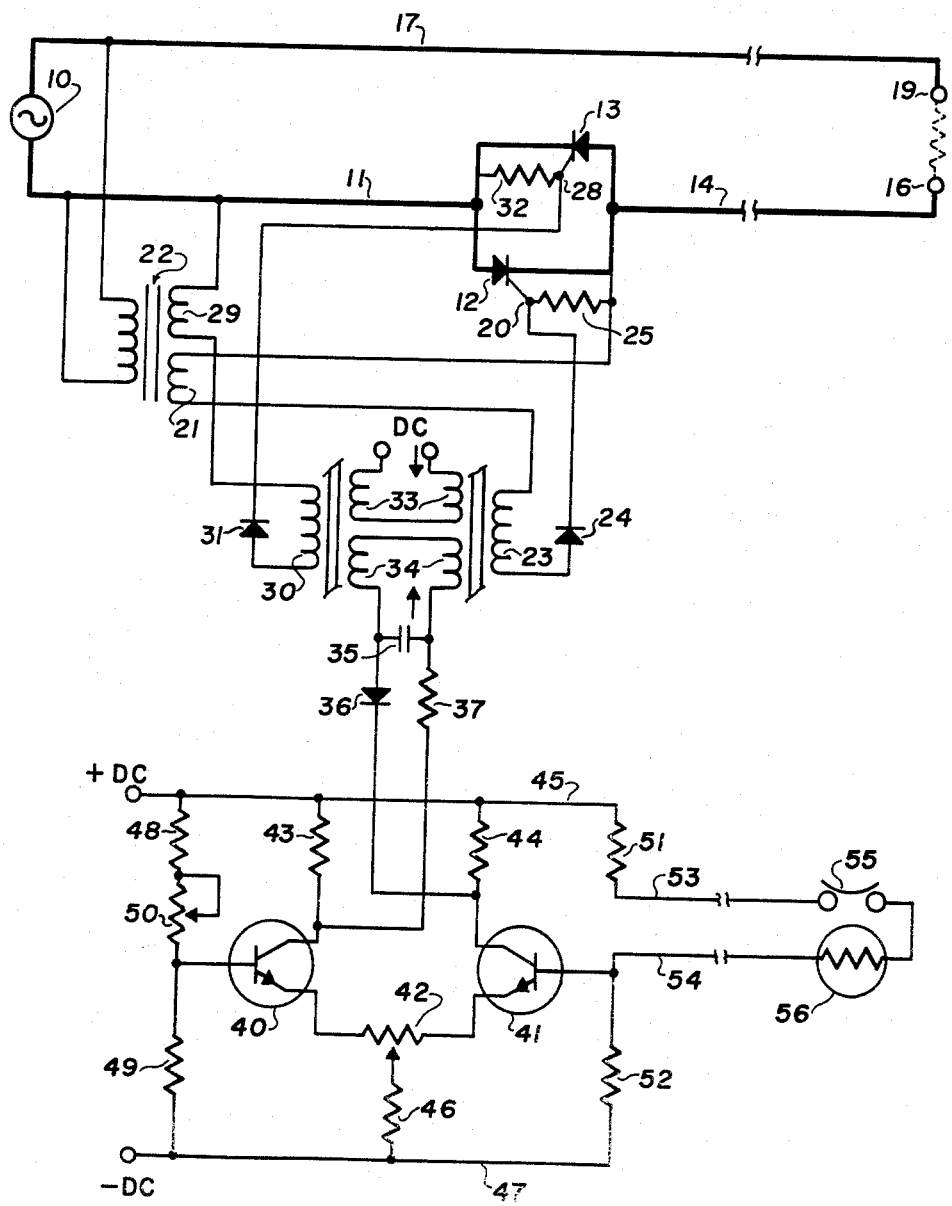

3,175,077
ELECTRICAL HEATER CONTROL SYSTEM
Alvin C. Fox and Gene G. Towry, both of Dallas, Tex., assignors to Texas Instruments Incorporated, Dallas, Tex., a corporation of Delaware
Filed Oct. 5, 1961, Ser. No. 143,241
1 Claim. (Cl. 219—494)

This invention relates to a temperature control system for an electrical heater and more particularly to an oil well heater system which is adapted for automatic control.

The rate of production of an oil or gas well may be sometimes greatly increased by melting the accumulated paraffin and low viscosity oil in the region of flow. This is ordinarily accomplished by dropping an electrical heater into the well, the heater merely taking the form of a pair of spaced electrodes. The saline liquid within the well provides a path for current flow and so provides the heater resistance between the electrodes. Large values of current are necessary to provide heating in this manner and the current must be closely controlled in response to the well temperature. If the temperature is too low, the process will be ineffective, while if the temperature is allowed to rise too high, there may be detrimental effects on the petroleum products or vaporization of the liquids in the well may result. These systems would be ordinarily utilized in remote areas which might soldom be visited by operators. Accordingly, it is especially important that the system not only maintain the proper temperature range within the well, but also be quite reliable and require a minimum of adjustment and maintenance.

It is the principle object of this invention to provide an automatic temperature control system for a high-current electrical heater of the type adapted for oil well use. Another object is to provide an oil well heater control system adapted for automatic operation in remote areas. A further object is to provide an oil well heater control system making optimum utilization of solid-state electrical components.

In accordance with this invention, a temperature control system for an oil well heater is constructed primarily with solid-state circuit components. The heater electrodes are connected to an A.C. source through a pair of silicon controlled rectifiers, these controlled rectifiers being connected back-to-back so that an alternating voltage appears across the heater electrodes. The fraction of each half cycle during which each of the rectifier conducts is, of course, determined by the firing angles. The gate electrodes of the rectifiers are driven by a saturable reactor arrangement which provides triggering pulses variable over each half cycle in response to the output of a differential amplifier. The differential amplifier includes two transistors connected in a differential configuration, the base of one transistor being selectively biased to set the desired temperature. The input to the other transistor includes a pair of temperature-sensitive elements located in the well. One of the elements is continuously variable in resistance according to temperature within the desired range and the other is adapted to open the circuit at a certain high temperature above the usual range. This provides a closed-loop temperature control system especially adapted for oil well heater use.

The novel features believed characteristic of this invention are set forth in the appended claim. The invention itself, however, along with further objects and the advantages thereof, may best be understood by reference to the following detailed description, when read in conjunction with the accompanying drawing wherein the single figure is a schematic diagram of the electrical circuit of the oil well heater control system of this invention.

With reference to the figure of the drawing, the temperature control system includes an alternating current source 10 which may comprise an isolation transformer connected to the local A.C. distribution line. One side of the source 10 is connected by a line 11 to the anode of a silicon controlled rectifier 12 and to the cathode of a silicon controlled rectifier 13. The other anode and cathode of the pair of controlled rectifiers 12 and 13 are connected together and to a line 14 which is connected through a long cable leading down into the well to an electrode 16 which forms parts of the oil well heater. The other terminal of the source 10 is directly connected by a line 17 through the cable going into the well to the other electrode 19 of the oil well heater. It is seen that the source voltage will appear across the terminals 16 and 19 to the extent that the controlled rectifiers 12 and 13 are conductive. The source voltage will be an alternating potential which is necessary to prevent electrolysis and corrosion in the well.

The firing angles of the controlled rectifiers 12 and 13 are controlled in response to the well temperature by a circuit which may include a saturable reactor arrangement driven by a differential amplifier. Thus, a gate electrode 20 of the controlled rectifier 12 is connected to the cathode of the rectifier by the external circuit which includes a secondary winding 21 on a transformer 22 along with a winding 23 on a saturable reactor arrangement. The transformer 22 includes a primary winding connected across the source 10, and so provides an alternating voltage on the secondary 21 which is in phase with the line voltage. The impedance of the winding 23 will be very high before the core of the saturable reactor is saturated and very low thereafter so that the voltage appearing on the control electrode 20 will be virtually zero until after the core of the winding 23 saturates. Upon saturation a current pulse will be provided to the gate 20 through a diode 24 to fire the controlled rectifier. A resistor 25 shunts the gate 20 to the cathode circuit. In a like manner a gate electrode 28 of the other controlled rectifier 13 includes an external gate-to-cathode circuit comprising a secondary winding 29 on the transformer 22 and an output winding 30 on the saturable reactor. This winding is connected through a diode 31 to the gate 28 while the gate is shunted to the cathode by a large resistor 32.

The saturable reactor cores are controlled by a fixed bias plus a bias which is variable in response to well temperature. A bias winding 33 on the saturable reactor is driven by a constant direct current which may be derived by a rectifier arrangement from the source 10. This bias current is sufficient to reset the cores of the saturable reactor after each half cycle in the absence of further bias current. Control windings 34 are also adapted to bias the cores, this being in response to the temperature in the well. In this manner the point in each half cycle at which the cores saturate may be controlled and thereby the firing angle of the controlled rectifiers determined. A smoothing capacitor 35 is connected across the terminals of the winding 34. One of these terminals is connected through a diode 36 to one output of a differential amplifier while the other terminal is connected through a resistor 37 to the remaining output point of the differential amplifier.

The differential amplifier comprises a pair of transistors 40 and 41 having a common emitter resistance 42 and separate collector load resistors 43 and 44 connected to a positive supply line 45, while the common resistor 42 is connected through a resistor 46 to a negative D.C. line 47 or ground. A preselected bias is applied to the base of the transistor 40 by a voltage divider arrangement including fixed resistors 48 and 49 and a variable resistor 50. This variable resistor is effective to select the temperature range of the control system by determining the balance condition of the differential amplifier. The base of the other transistor 41 is biased by a voltage divider arrangement connected between the lines 45 and 47 including fixed resistors 51 and 52 and two temperature sensitive elements which are located in the well at the end of a pair of long conductors 53 and 54. These elements include a temperature sensitive resistor 56 such as a Texas Instruments "Sensistor," and a thermostatic switch 55 such as a Texas Instruments "Klixon" control device.

In the operation of the system described above, it is seen that the source 10 is connected across the heater electrodes 16 and 19 for a percentage of each half cycle as determined by the firing angles of the controlled rectifiers 12 and 13. These firing angles are first selected according to the desired temperature which is determined by the setting of the potentiometer 50. The temperature within the well determines the resistance of the element 56, and if said temperature is less than desired, the voltage on the base of the transistor 41 tends to be high, increasing the conduction thereof and decreasing the collector voltage. An increased emitter current tends to cut off the other transistor 40 due to the common emitter resistor, and this raises the voltage on the collector of transistor 40. Current therefore flows through the winding 34 in the direction permitted by the diode 36. This current opposes the bias current in the winding 33 and decreases the amount which the cores of the saturable reactor are reset after each half cycle. Accordingly, the voltages impressed on the windings 23 and 30 by the windings 21 and 29 saturate the cores before the end of each half cycle and thus apply starting pulses to the gates of the controlled rectifiers 12 and 13 which conduct and supply heating current to the electrodes 16 and 19. If the well temperature is too high, on the other hand, the resistance of the element 56 will be high and the differential amplifier will be unbalanced in the other direction. The collector voltage of the transistor 41 will be positive with respect to that of the transistor 40 but no current will flow through the winding 34 due to the diode 36. In this condition, the cores will be reset each cycle, no firing pulses will appear on the gates 20 and 28, and no heater current will flow.

While this invention has been described with reference to a specific embodiment this description is not meant to be construed in a limiting sense. It is of course understood that various modifications may be made by persons skilled in the art and so it is contemplated that the appended claim will cover any such modifications thus far within the true scope of the invention.

What is claimed is:

A temperature-controlled current supply system for an oil well heater comprising:

(a) an alternating current source having two terminals,
(b) a pair of controlled rectifiers each having anode, cathode and gate electrodes,
(c) conductive means connecting one terminal of said source to the anode of one of said controlled rectifiers and to the cathode of the other of said controlled rectifiers,
(d) conductive means connecting the other terminal of said source to an electrode of said oil well heater,
(e) conductive means connecting the cathode of said one of controlled rectifiers and the anode of said other of said controlled rectifiers to the other electrode of said oil well heater,
(f) a saturable reactor having a pair of separate cores, a fixed bias winding and a variable bias winding surrounding both of said cores, a pair of output windings linking said cores separately,
(g) conductive means connecting one of said output windings, a portion of the output of said alternating current source, and the gate and cathode of one of said controlled rectifiers in a closed series circuit,
(h) conductive means connecting the other of said output windings, a portion of the output of said alternating current source, and the gate and cathode of the other of said controlled rectifiers in a closed series circuit,
(i) a pair of transistors connected in a differential amplifier circuit having a fixed bias input, a variable bias input, and an output,
(j) unidirectional conductive means connecting said output of said differential amplifier circuit to said variable bias winding of said saturable reactor,
(k) selective means for applying a predetermined voltage to said fixed bias input of said differential amplifier whereby a reference temperature within a given range may be established for said heater,
(l) and a pair of temperature sensitive elements connected in a series circuit, said series circuit being connected to said variable bias input of said differential amplifier, one of said elements being continuously variable in resistance in response to temperature within said given range, the other of said elements being adapted to open said series circuit upon the occurrence of a certain temperature above said given range.

References Cited by the Examiner

UNITED STATES PATENTS

| | | | |
|---|---|---|---|
| 2,752,473 | 6/56 | Hage | 219—497 |
| 2,872,556 | 2/59 | Obermaier | 219—499 |
| 3,040,158 | 6/62 | Cutler et al. | 219—210 |
| 3,076,924 | 2/63 | Manteuffel | 323—76 |

RICHARD M. WOOD, *Primary Examiner.*